Patented Aug. 30, 1932

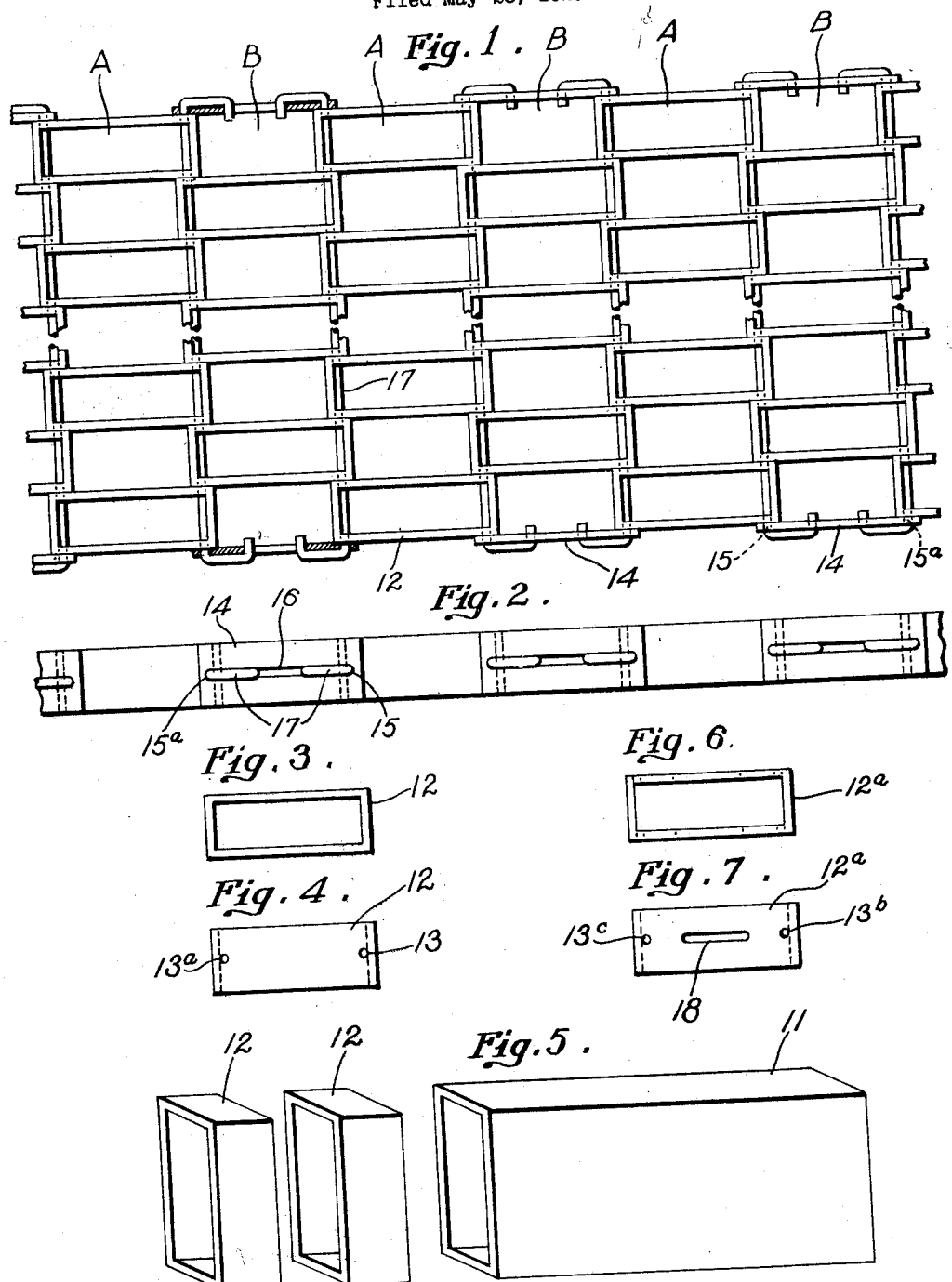

1,874,409

UNITED STATES PATENT OFFICE

JOHN C. ANDERSON, OF KEYPORT, NEW JERSEY

RECTANGULAR LINK CONVEYER

Application filed May 28, 1929. Serial No. 366,599.

My invention relates to conveyer belts and to methods for the construction thereof and more particularly to conveyer belts of the type which may be used for conveying glassware through an annealing lehr.

One of the objects of my invention is to provide a conveyer belt of minimum weight which retains the strength necessary for use in conveying glassware through an annealing lehr, the belt being of suitable thickness and wear resisting characteristics for such use.

A further object is to provide a belt of the type described so constructed as to prevent any tendency on the part of the belt to creep, to stretch, or to narrow during use.

A further object is to provide a belt of the type described having a maximum area of open spaces for the circulation of air in combination with a smooth and stable ware supporting surface.

Further objects of my invention will appear from the following specification and claims.

I have shown several embodiments of the mechanical features of my invention in the accompanying drawing, in which:

Figure 1 is a plan view of a fragment of a belt constructed according to my invention, with parts broken away;

Fig. 2 is an elevation of the fragment of conveyer belt shown in Fig. 1;

Fig. 3 is a plan view of a link used in the construction of the conveyer belt shown in Fig. 1;

Fig. 4 is an elevation of the link of Fig. 3;

Fig. 5 is a perspective of a tubular member and of links cut therefrom illustrating the method of forming said links;

Fig. 6 is a plan view of a modified form of link, and

Fig. 7 is an elevation of the link of Fig. 6.

In the general construction of a belt according to my invention a tube which may be of rectangular cross section and is of suitable size may be sheared into links of suitable width as is illustrated in Fig. 5. Holes may be then punched in each of these links adjacent to the ends thereof, as is shown in Fig. 4. The links may be then assembled, as shown in Fig. 1, by positioning alternate links with one hole of each aligned with a hole in the other and with the ends opposite the aligned holes opposite to each other. Edge plates are placed along the edges so as to provide a substantially smooth edge and connecting wires are threaded through the aligned holes.

Referring particularly to the drawing, a tubular member 11 of suitable material, preferably metal, and of rectangular configuration in cross section may be sheared, as by the use of a suitable die, into a plurality of links 12, each link being of the desired width. Holes 13 and 13a may then be punched through the sides of the links adjacent to the ends thereof as is shown more clearly in Fig. 4. Edge protecting plates 14 of suitable width may be formed of metal, each of these plates having holes or apertures 15 and 15a formed adjacent the ends thereof and having a slot 16 formed substantially centrally thereof. Such slot may extend longitudinally of the edge plate.

The improved conveyer belt constructed from the links above described may be said to comprise alternate flexibly connected sections A and B. Each of these sections may comprise a plurality of links 12 disposed in parallel relationship to each other and so disposed that ends of the links of each section B will be interposed between the ends of the links of the adjacent sections A and the ends of the links of each section B will be likewise interposed between the ends of the links of the adjacent sections A and so that the aforesaid holes adjacent to the ends of the links of each section will be aligned with the holes near the adjacent ends of the links of the adjacent sections. Wires 17 are inserted through the aligned holes in the links of the adjacent sections and through holes 15 and 15a in the side edge plates 14. Then the end portions of the wires are bent onto the edge plates 14 through which they extend and then back into the slots 16 of such plates, whereby the wires will be secured in place without lessening the flexibility of the belt and so that the sides may be relatively smooth. The manner in which the ends of the wires 17 are secured may be varied considerably. The wires 17 are of sufficient diameter and are made of suitable material to resist bending and shearing stresses when the belt is placed under load or a pull is exerted thereon.

In Figs. 6 and 7, I have shown a modified form of link 12a having holes or apertures 13b and 13c adjacent to the ends thereof and also having in addition a slot 18 which may be die punched at the same time that the holes 13b and 13c are punched. This slot is provided for the purpose of making the conveyer belt of greater lightness than the form shown in Figs. 3 and 4.

It is to be understood that the above described embodiments of my invention are for the purpose of illustration only and various changes may be made therein without departing from the spirit and scope of the invention.

I claim as my invention:

1. A conveyer belt fabric comprising a plurality of assembled links, each link consisting of a vertically open integral rectangle, the four sides of which are vertical, the longer sides of the rectangle having holes passing through the end portions thereof inwardly of its opposed parallel ends, and means passing through the holes for connecting said rectangles, the holes in the sides of said rectangles being so arranged that the said connecting means holds the rectangles with the sides thereof in overlapping relation, and the top edges of the rectangles in a common plane, thereby providing longitudinally continuous supporting edges when the fabric is flat.

2. A conveyer belt structure comprising a plurality of vertically open links, each of said links being of quadrilateral shape in cross-section in the plane of the belt and having holes passing through the side walls thereof inwardly of opposed parallel end walls thereof, and connecting members passing through said holes for holding the links with the side walls thereof in overlapping relation and the top edges thereof in a common plane, the top edges of the overlapping sides of said links thereby providing longitudinally continuous supporting edges at least when the belt structure is flat.

3. A conveyer belt fabric comprising a plurality of assembled four-sided integral links, each link being vertically open and rectangular in cross section and having holes passing through the sides thereof inwardly of its opposite parallel ends, additional holes intermediate the first named holes for decreasing the weight of the fabric, edge protecting plates having holes adjacent the ends thereof adapted to be aligned with the holes of certain of the links and having additional holes intermediate the first named holes for decreasing the weight of said plates, and wires threaded through the aligned holes of the links and the edge protecting plates for connecting said links in overlapping relationship with each other and the plates in overlapping relation with the outermost links, said holes and wires being arranged to hold the links and side members with the top edges thereof in a common plane at least when the fabric is flat.

4. A conveyer belt fabric comprising a plurality of assembled links, each link being vertically open and rectangular in cross section and having holes passing through the sides thereof inwardly of its opposed parallel ends, and additional holes intermediate the first named holes for decreasing the weight of the said links, edge protecting plates having holes adjacent the ends thereof, adapted to be aligned with the holes of the links and having additional holes intermediate the first named holes for decreasing the weight of said plates, the said links being disposed in overlapping relationship with each other, and the plates overlapping the outermost links, the links being so arranged that they present only the edges of the vertical sides thereof to the ware being transported and to the bearing surface over which the belt passes, and wires threaded through the aligned holes of the links and of the edge protecting plates for connecting said links and plates and for holding them in overlapping relation with their topmost edges in a common plane at least when the fabric is flat, the wires being bent over outside of the edge protecting plates and back into the fabric through the intermediate holes of said edge protecting plates.

5. A conveyer belt fabric comprising a plurality of links, each link being vertically open and rectangular in cross section and having holes passing through the sides thereof inwardly of its opposed parallel ends, the links being disposed in rows crosswise of the belt with the links of each row in overlapping relationship with the links of the adjacent rows and with one of the holes of each link in each row aligned with holes in the overlapping portions of adjacent links, edge protecting plates placed in alignment with the links of alternate rows, said plates having holes in alignment with the holes of the links of the said rows, and wires threaded through the aligned holes of the links and of the edge protecting plates for connecting said links and said plates in overlapping relation with the topmost edges thereof in a common plane at least when the fabric is flat, said wires having their ends secured to prevent longitudinal displacement thereof and to provide substantially smooth surfaces at the side edges of the belt fabric.

Signed at Keyport, New Jersey, this 23rd day of May, 1929.

JOHN C. ANDERSON.